(12) United States Patent
Hazenbroek et al.

(10) Patent No.: US 7,070,493 B2
(45) Date of Patent: Jul. 4, 2006

(54) SKINNER FOR POULTRY CARCASSES

(75) Inventors: Jacobus Eliza Hazenbroek, Klaaswaal (NL); Bastiaan Verrijp, Numansdorp (NL)

(73) Assignee: Systemate Group, B.V., Numansdorp (NL)

( * ) Notice: Subject to any disclaimer, the term of this patent is extended or adjusted under 35 U.S.C. 154(b) by 116 days.

(21) Appl. No.: 09/899,319

(22) Filed: Jul. 5, 2001

(65) Prior Publication Data

US 2003/0008606 A1 Jan. 9, 2003

(30) Foreign Application Priority Data

Jul. 5, 2000 (NL) .............................................. 1015614

(51) Int. Cl.
*A22C 21/00* (2006.01)

(52) U.S. Cl. ......................................... 452/83; 452/130
(58) Field of Classification Search .................. 452/82, 452/83, 84, 85, 128, 129, 130
See application file for complete search history.

(56) References Cited

U.S. PATENT DOCUMENTS

| 2,461,466 | A | | 2/1949 | Coad .............................. 17/21 |
| 3,541,637 | A | * | 11/1970 | Robinson et al. ........... 452/128 |
| 3,714,682 | A | | 2/1973 | Harben, Jr. ..................... 17/11 |
| 3,729,775 | A | | 5/1973 | McDonald ..................... 17/62 |
| 4,723,339 | A | * | 2/1988 | van de Nieuwelaar et al. .. 452/130 |
| 4,856,143 | A | | 8/1989 | Callsen et al. .................. 17/11 |
| 5,098,336 | A | | 3/1992 | DeLong ....................... 452/130 |
| 5,167,569 | A | * | 12/1992 | Davis .......................... 452/130 |
| 5,248,277 | A | * | 9/1993 | Bos et al. .................... 452/125 |
| 6,086,470 | A | * | 7/2000 | Ranniger .................... 452/127 |
| 6,142,863 | A | * | 11/2000 | Janssen et al. .............. 452/128 |
| 6,579,164 | B1 | * | 6/2003 | Groth ......................... 452/125 |

FOREIGN PATENT DOCUMENTS

| EP | 0104117 A2 | * | 9/1983 | ................. 452/130 |
| EP | 0 756 826 A2 | | 5/1997 | |
| NL | 8302207 | | 6/1983 | |
| NL | 8302207 | | 1/1985 | |
| WO | PCT/EP00/06569 | | 1/2001 | |

* cited by examiner

*Primary Examiner*—Harvey E. Behrend
*Assistant Examiner*—Susan C. Alimenti
(74) *Attorney, Agent, or Firm*—Thomas, Kayden, Horstemeyer & Risley, LLP

(57) ABSTRACT

The invention relates to a device for processing poultry carcasses or parts thereof, comprising a conveyor having supports for retaining the carcasses or parts thereof, which conveyor is provided with means for leading the supports in a supply direction past at least one processing installation. The device further comprises a skinner for skinning the carcasses or parts thereof, which skinner is provided with skin gripping means for gripping the skin and means for moving the skin gripping means relatively with respect to the carcass and substantially perpendicular to the supply direction during skinning.

3 Claims, 5 Drawing Sheets

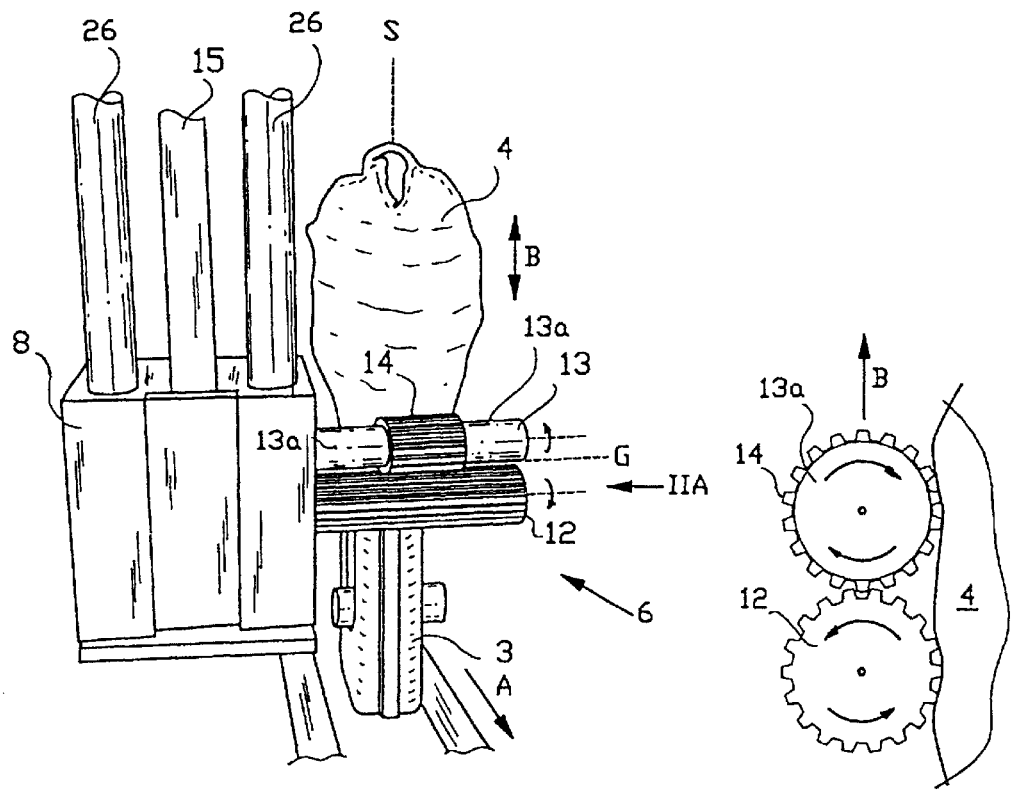
FIG. 2
FIG. 2A
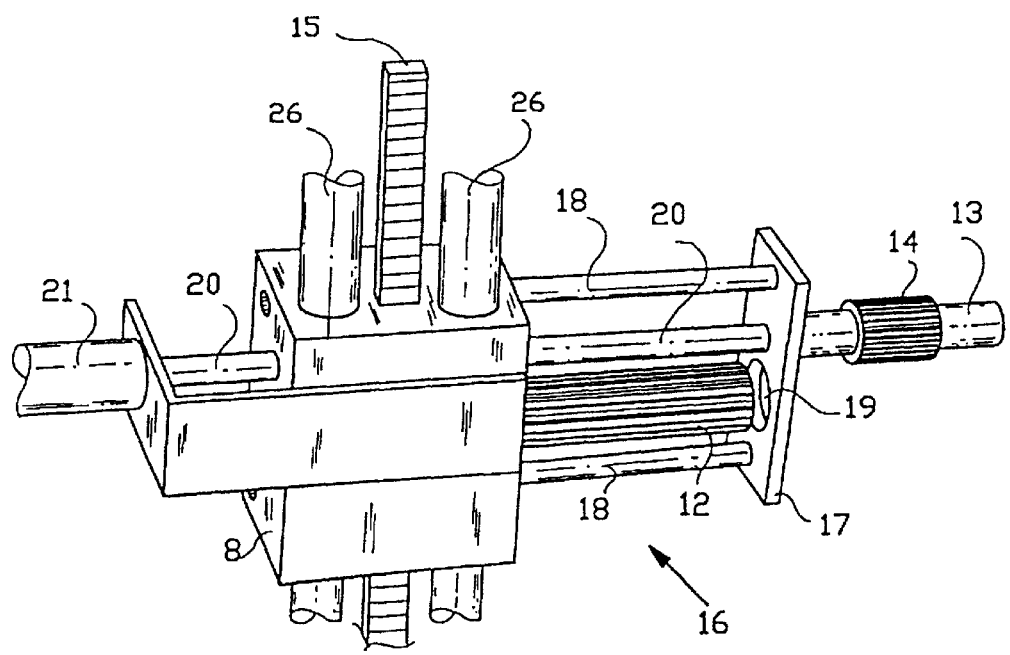
FIG. 3

SKINNER FOR POULTRY CARCASSES

TECHNICAL FIELD

The invention relates to a device for processing poultry carcasses or parts thereof, preferably breast parts or breast caps and the like.

BACKGROUND ART

In general such a device comprises a conveyor for conveying the carcasses or parts thereof past various processing installations. To that end the conveyor comprises supports for retaining the carcasses or parts thereof, and means for leading the supports along a supply direction past the processing installations. Additionally such a device may comprise a skinner for skinning the carcasses or parts thereof.

Generally, such (automated) skinners for poultry are known. These devices are then provided with skin gripping means that are stationary with respect to the carcass.

For instance, U.S. Pat. No. 5,197,917 describes a skinner having two rollers rotating in opposite directions having an engaging toothing, which rollers during skinning are stationary with respect to the leg to be skinned. The carcass parts such as legs are laid on a rotating disc having holes. The disc each time rotates on so that the next hole with carcass part gets in front of the skinner. A drawback of such known stationary skin gripping means is that in general the skin cannot be detached as a whole from the poultry.

As a result residues of skin may be left or the entire skin may be left. Membranes situated between the skin and the meat may also be left. In other cases the meat can get damaged during skinning.

U.S. Pat. No. 4,856,143 endeavours to solve these problems by means of a skinner provided with two straight circle cones rotating in opposite directions having engaging teeth as skin gripping means. The skin gripping line of the cones is parallel to the supply direction. By means of a sensor the level of the cones prior to skinning can be adjusted to a certain degree. During skinning the skin gripping line further is stationary with respect to the carcass. Amongst others because of the increasing speed between the cones the skin might be broken, and it may occur that the skin is not pulled off all round as a whole from the carcass. Moreover the back membrane will not be removed.

DISCLOSURE OF THE INVENTION

An object of the invention is to at least partially improve on the above-mentioned problems.

To that end the invention provides a device for processing poultry carcasses or parts thereof, comprising a conveyor having supports for retaining the carcasses or parts thereof, which conveyor is provided with means for leading the supports in a supply direction past at least one processing installation, wherein the device comprises a skinner for skinning the carcasses or parts thereof, which skinner is provided with skin gripping means for gripping the skin and means for moving the skin gripping means relatively with respect to the carcass and substantially perpendicular to the supply direction during skinning.

Because the skinner is provided with means for moving the skin gripping means relatively with respect to the carcass and substantially perpendicular to the supply direction, the possibility is created to remove the skin undamaged and as a whole from the carcass in a quick and reliable manner. As a result the skinner is particularly suitable to be used in industrial processing lines.

A better and more reliable skinning is achieved when the skin gripping means define a skin gripping line that is transversal to the supply direction. It is preferred here that the conveyor is provided with vertical supports. The support here lies in the plane of symmetry of the carcass.

In order to grip the skin well and reliably, independent of the shape and size of the carcass, the skinner is provided with pressing means for pressing the skin gripping means on the carcass or a part thereof. This can be done even more easily when the skinner is provided with means for moving the skin gripping means towards the carcass.

In order to be able to grip carcasses of various sizes, and to be able to pull off the skin from the carcass well, the skinner comprises an arm substantially perpendicular to the supply direction, that is provided with skin gripping means. Preferably the arm at its one end is provided with a rotary shaft about which the arm can rotate, and at the other side is provided with skin gripping means that can be moved along the arm. For pressing the skin gripping means against the carcass well, the arm is extended, preferably past the point of rotation, so that a lever is created. The point of rotation can now lie both underneath and above the carcass. By providing the extended arm with pressing means the arm provided with skin gripping means can be moved towards the carcass. As a result a large flexibility as to types and sizes of carcasses that can be skinned is realised.

Preferably the skin gripping means comprise two rollers rotating opposite to and, considered from the carcass, towards each other. Because of such rollers the skin can be gripped in a reliable manner. Moreover the distance between the carcass and the point where the skin is gripped can remain small because the skin can be wound around one of either rollers. In this case preferably only one of either roller comprises means for its driving. The other roller can rotate along freely. As a result there is less chance of damage to the skin.

The rollers have been positioned with respect to each other for gripping the skin and retaining it.

In order to prevent the skin from slipping out of between the rollers or from not being engaged, the rollers have been provided with a skin gripping surface. Preferably the rollers have been provided with corrugations in the longitudinal direction, preferably a planar toothing. The toothings preferably are staggered half a pitch with respect to each other and then engage a little, though not completely, one into the other. Preferably one of the rollers, preferably a non-driven roller, comprises a middle portion that is provided with a corrugated surface all round, and outsides or ends having a diameter smaller than the middle portion, which preferably is not provided with corrugations or is smooth. As a result damage to the sides if the skin is prevented, which appeared to be very advantageous for skinning all round.

In order to remove the skin from the skinner after skinning, it preferably is provided with discharge means for the skin. Such discharge means for simple and reliable discharge comprise means for moving one of either roller past its axis of rotation.

Such means may comprise an ejection plate, perpendicular to the longitudinal axis of both rollers, in which the first roller is attached to the ejection plate, and the ejection plate is provided with a hole for sliding over the second roller, in which the ejection plate is provided with means for moving the ejection plate to a discharge position from an inactive position to the outside over and perpendicular to the axis of rotation of the second roller. As a result the skin is ejected to the sides so that a reliable discharge is realised and the skin does not end up in the device where the skin may cause pollution or failure.

Preferably the means for moving the skin gripping means perpendicular to the supply direction are in connection to the means for having the rollers rotate. More preferably the means for moving the skin gripping means perpendicular to the supply direction rotate at least one of the rollers. As a result a simple and reliable structure is created.

Preferably the device comprises a rail parallel to the supply direction, onto which the skinner is movably attached. As a result the skinner can run along with the supports and the carcass during skinning, because of which there is no delay in the processing line.

In order to press the skinner against the carcass well and to be able to coordinate the various actions well the device comprises at least one sensor for locating the supports with respect to the skinner. Additionally the skinner comprises at least one sensor for locating the skin gripping means on the skinner, preferably at least one sensor for detecting whether the skin gripping means are situated near the tip of the carcass, where the skin gripping means have to start gripping the skin.

The invention further relates to a method for skinning poultry carcasses or parts thereof, particularly chicken, in which skin gripping means grip the skin at one side of the carcass, and the skin gripping means are moved past the carcass in a pull-off direction of the skin, in which the skin is pulled substantially perpendicular to the carcass at the location where the skin becomes detached from the carcass. Preferably the skin is pulled in the direction of the breastbone from the lower side of the tip of the breastbone to the upper side of the breastbone.

Preferably the skin gripping means comprise rollers that are pressed against the carcass, at least one of either roller being rotated so that the skin is gripped between the rollers, after which the rollers are moved past the carcass in the pull-off direction of the skin while the rollers rotate in opposite direction, clamping the skin in between them and winding it around one of the rollers.

By using the rollers the chance that the skin gets damaged and the carcass is not completely skinned is considerably reduced.

Preferably after reaching the other side of the carcass the skinner is moved relatively with respect to the carcass opposite to the supply direction, pulling the skin off from the other side of the carcass, after which the skin can be slid from the rollers. The other side is the side that faces away from the skinner when the skinning is started. In that way the carcass can be skinned all round.

Because the skinner runs on with respect to the carcass the skin at the back side, namely the side opposite the side where the skinning was started, is also pulled off from the carcass.

The invention also relates to a device for processing poultry carcasses or parts thereof, comprising a conveyor comprising supports for retaining the carcasses or parts thereof, which conveyor is provided with means for leading the supports in a supply direction past processing installations, in which the device comprises a skinner for skinning the carcasses or parts thereof, which skinner is provided with an arm perpendicular to the supply direction provided with skin gripping means for gripping the skin.

The invention moreover relates to a device for processing poultry carcasses or parts thereof, comprising a conveyor comprising supports for retaining the carcasses or parts thereof, which conveyor is provided with means for leading the supports past processing installations, in which the device comprises a skinner for skinning the carcasses or parts thereof, which skinner comprises skin gripping means and is provided with means for moving the skin gripping means in a plane of symmetry of the carcass. Preferably the skin gripping means can be moved in the plane of symmetry of the carcass and past the carcass. As a result the tension on the skin during skinning appears to be reduced and the possibility of tearing decreases.

Additionally the invention relates to a device for processing poultry carcasses or parts thereof, comprising a conveyor comprising supports for retaining the carcasses or parts thereof, which conveyor is provided with means for leading the supports past processing installations, in which the device comprises a skinner for skinning the carcasses or parts thereof, which skinner comprises skin gripping means and discharge means for ejecting the skin from the skin gripping means. As a result the skin can be removed quickly and the skinner is quickly ready again for use, and no blockage occurs.

The invention further relates to a device for processing poultry carcasses or parts thereof, comprising a conveyor comprising supports for retaining the carcasses or parts thereof, which conveyor is provided with means for leading the supports past processing installations, in which the device comprises a skinner for skinning the carcasses or parts thereof, which skinner comprises skin gripping means, which skin gripping means have a skin gripping line that is perpendicular to the supply direction. Preferably the skin gripping line is substantially perpendicular to the plane of symmetry of the carcass. As a result the skin can be removed well from the carcass.

The invention also relates to a device for processing poultry carcasses or parts thereof, comprising a conveyor comprising supports for retaining the carcasses or parts thereof, which conveyor is provided with means for leading the supports past processing installations, in which the device comprises a skinner for skinning the carcasses or parts thereof, which skinner comprises skin gripping means, which skin gripping means comprise two clamping rollers rotatable in opposite directions, in which the skinner comprises means for moving the rollers which means are also a means for rotating at least one of the rollers.

As a result a simple and failure-free structure is possible.

The skinner is particularly efficient for skinning carcasses and breast cap on an industrial scale of carcasses and parts thereof in which a breast cap is present. The skinner then comprises means for moving the skin gripping means past the breastbone. The measures mentioned can be combined one and the other as a result a skinner is created which very advantageously can be used on an industrial scale, particularly in a processing line such as in a straight slaughtering line, which is operationally reliable and fast.

Some embodiments of the invention have been shown in the figures as an elucidation thereof, in which:

BRIEF DESCRIPTION OF THE DRAWINGS

FIG. 2 shows a front view of the skin gripping means,

FIG. 2A shows a side view according to line IIA of the rollers,

FIG. 3 shows the skin discharge means,

MODES FOR CARRYING OUT THE INVENTION

Figure 1:
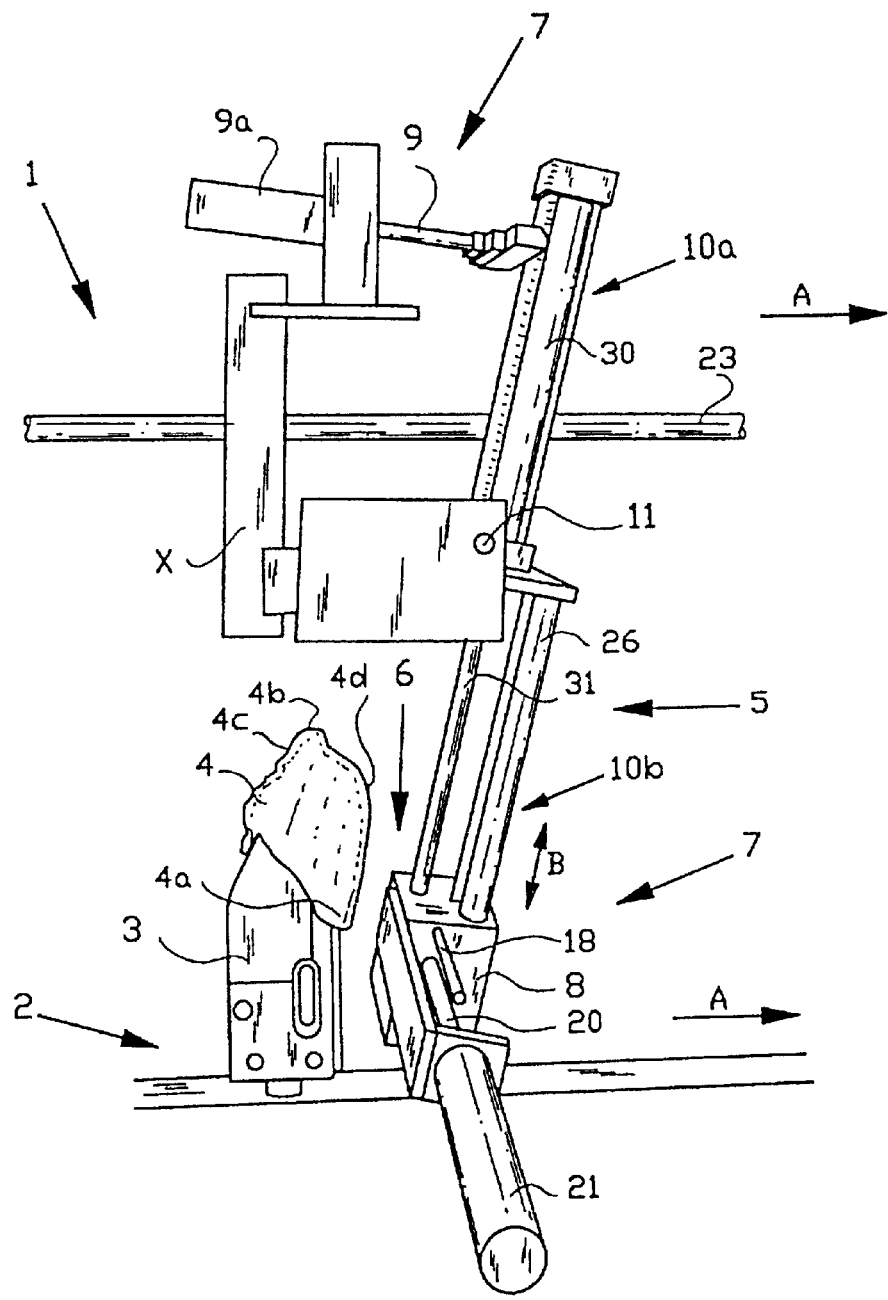
FIG. 1 shows a side view of a part of the device having a skinner.

FIG. 1 shows a part of a device 1 according to the invention. Such a device among others comprises a conveyor 2 having supports 3 movably attached thereon. In the figure a vertical upright support 3 is shown. The conveyor 2 is provided with means (not shown) to move the supports 3 along the supply direction A. On the supports 3 means (not shown) are present to retain the carcass 4. Such a support 3 is for instance described in U.S. Pat. No. 5.951.393. On the support 3 a breast/back portion of a carcass 4 of for instance a chicken has been secured. In this case 4a is the chest tip, 4b the neck side, 4c the back side and 4d the breast side.

The skinner 5 is provided with a frame x. The frame x can be moved along a rail 23 in a direction A and a direction opposite to it by means that are not shown. To the frame x a movable arm 10b extending downward, has been attached, rotatable about shaft 11, the arm 10b being provided with a holder 8 to which skin gripping means 6 have been attached (in the figure at the hidden side: the skin gripping means have been shown in FIGS. 2–4C). The holder 8 is upwardly and downwardly movable in the direction B by means of pneumatic cylinder 30, and piston rod 31. In the figure the holder 8 slides over slide bars 26.

The arm 10b is extended by arm 10a. Arm 10b and 10a form a lever with rotary shaft 11, substantially perpendicular to the supply direction A. To frame x a pneumatic cylinder 9a has also been attached with piston rod 9 which presses against arm 10a. The lever 10a, b and pneumatic cylinder 9 with piston rod 9 form means 7 for moving the skin gripping means 6 forward and backward, towards the carcass 4 and against the carcass 4. By maintaining a constant pressure in the pneumatic cylinder a constant pressing force can be maintained. This arrangement is preferred in connection with possible pollution. It is of course also possible to reverse the arrangement, that means selecting the point of rotation of the lever underneath the carcass, and arranging the skin gripping means on the upper arm.

FIG. 2 shows a front view of the skinner 5. A carcass 4 moves with a support 3 to the skinner in the supply direction A. The skin gripping means are formed here by a first lower roller 12 and a second upper roller 13. The line where the surfaces of the rollers approach each other closest is indicated in the figure as the skin gripping line G. The rollers are circle cylindrical. The (in this case) lower roller 12 is provided with corrugations, along the shaft direction of the roller over the entire length of the roller and the upper roller 13 is only provided with a corrugated portion in a middle area 14, with corrugations in the longitudinal direction of the roller. The ends 13a are smooth and not provided with corrugations. By providing one of the rollers with a corrugated portion in the middle area 14 only, it is prevented that the skin is crushed at the bent portions of the carcass: when the skin is damaged at the edges there is the possibility that the skin is not completely removed from the sides of the carcass.

In FIG. 1 and 2 the holder 8 which during skinning can be moved in the direction B perpendicular to the supply direction A, is shown. As the supports 3 have been placed straight up, this means that in this case the skin gripping means move up and down, perpendicular to the supply direction A and parallel to the plane of symmetry S of the carcass. The holder 8 is moved up and down by the pneumatic cylinder 30 and piston rod 31. The entire holder with the skin gripping means here slides over both slide rods 26 on either side of rack a 15. The lower roller 12 is connected to a toothed wheel (in holder 8, not shown). During moving the holder 8 with skin gripping means 6 up and down, said toothed wheel runs over rack 15 and the toothed wheel and the rack 15 form a pinion rack assembly that drives roller 12 in rotation. As a result, the means for moving the skin gripping means up and down also ensures the rotation of roller 12.

In FIG. 2A a side view of the two rollers 12 and 13 can be seen, in which the direction of rotation with respect to the carcass 4 has been indicated. It can clearly be seen that the corrugations have a level toothing and are staggered at half a pitch. The teeth engage into each other, but not entirely so as not to damage or tear the skin. The roller 13 is thus also driven by roller 12.

In FIG. 3 the discharge means 16 can be seen in detail, shown in the position in which the skin has been ejected. By means of the discharge means the skin that has been pulled off can be very quickly removed to the side from the skinner 5. In the figure an ejection plate 17 is shown provided with a hole 19, because of which the ejection plate 17 is slidable over the lower roller 12. The ejection plate 17 here is attached to the housing for the driving means 8 by means of bars 18 that are able to slide through the housing.

Additionally a driving rod 20 is shown because of which the plate 17 can be reciprocally moved between a retracted position and a discharge position. The upper roller 13 provided with the corrugated middle portion 14 can then either be attached to the ejection plate 17 in a manner in which the roller is able to rotate freely. It is also possible that the roller is provided with a guidance as a result of which the roller can slide over the driving rod 20 and in which the roller at the end is provided with retaining means as a result of which the roller 13 in the most extreme position is retained at the end of the driving rod 20. The roller 13 preferably is arranged in a free-rotating manner.

The ejection plate is driven by a gas pressure or pneumatic cylinder 21 that is connected to the driving rod 20, the piston rod of the pneumatic cylinder.

Figure 4A:
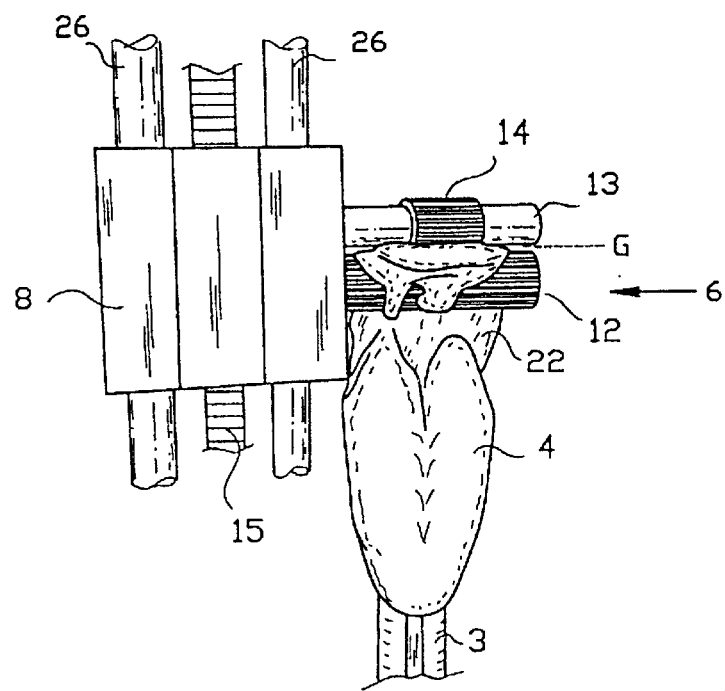
FIG. 4A shows a front view during skinning.
Figure 4B:
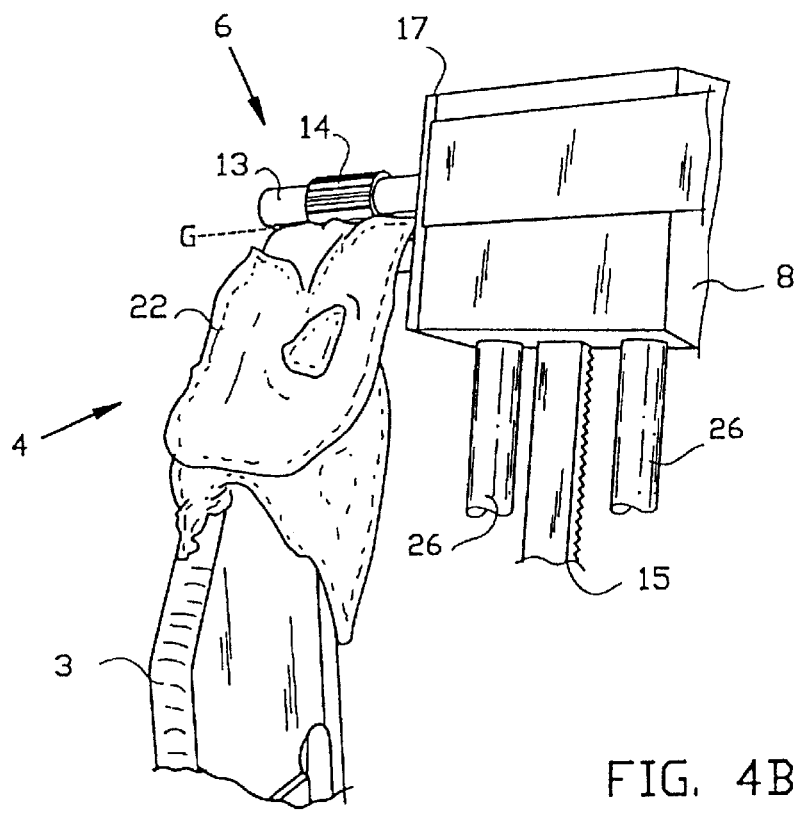
FIG. 4B shows a rear view during skinning.
Figure 4C:
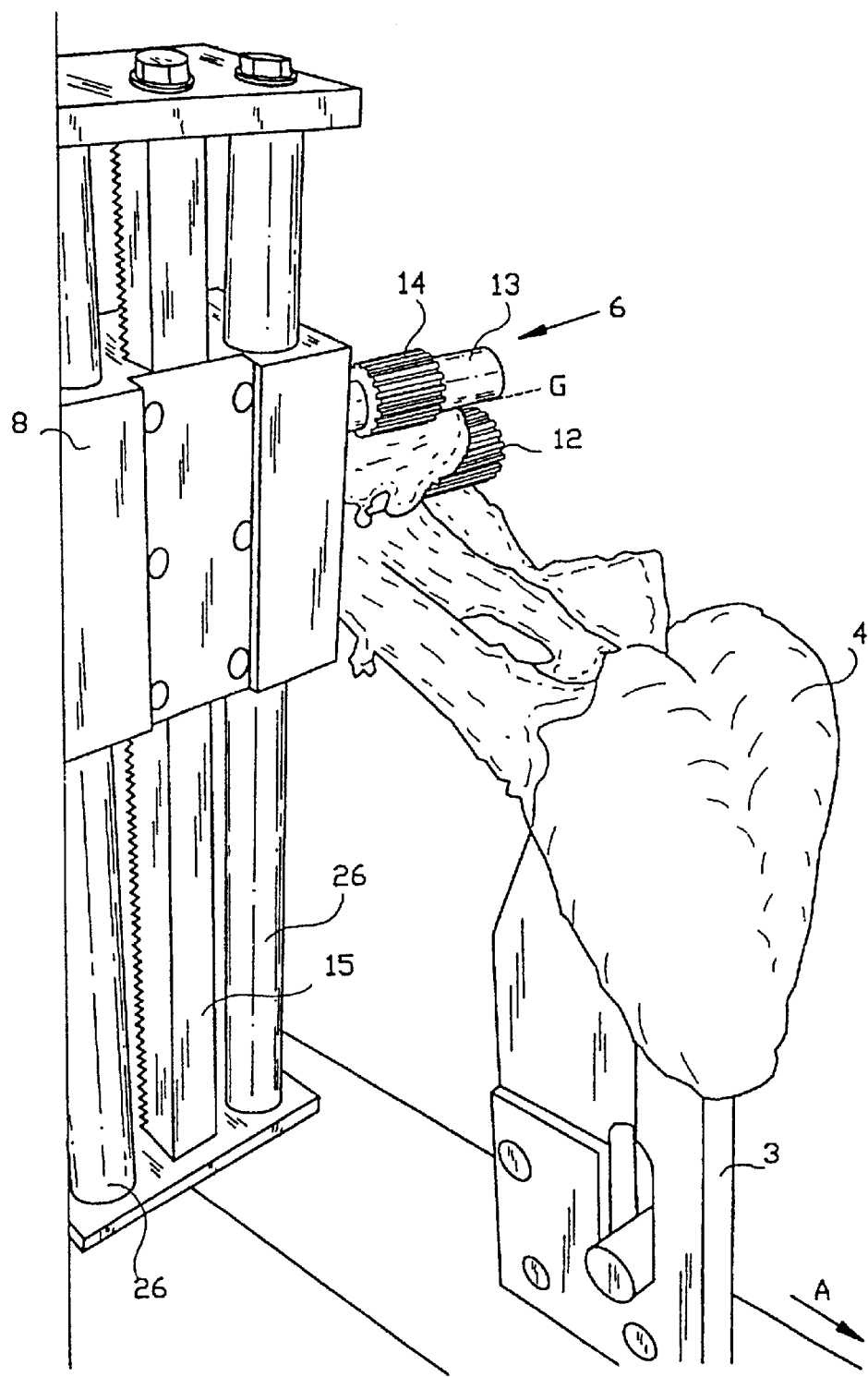
FIG. 4C shows a front view of the final stage of skinning.

FIGS. 4A, 4B and 4c show a front and rear view and consecutive stages of the skinning of the method according to the invention. In the initial position the rollers are situated near the point of rotation 11 of FIG. 1. In the position of FIG. 2 it could be seen that the rollers 12 and 13 were pressed against the carcass, at the tip side of the carcass. To that end the gripping means were moved downward along the carcass to roughen the skin a little and possibly loosening it from the carcass. During these movements, and even during the entire skinning procedure the supports on the conveyor run on regularly. A sensor detects when the holder has reached the lower side of the arm 10b. Relatively the skinner first approaches the supports and to that end moves for instance counter to the supply direction and, when the skin gripping means have reached the carcass, assumes the speed and direction of movement of the carcass.

After the sensor has detected that the skinner has reached the lower side of the arm 10b, the skin gripping means are moved towards the carcass by means for moving the skin gripping means 6 forward and backward and are pressed against the carcass 4: the pneumatic cylinder 9 is pressurized because of which the arm 10a moves into the supply direction and arm 10b moves counter to the supply direction. The skin gripping means grip the skin at the lower side of the carcass, at the tip, while the skinner 5 as a whole moves along with the support 3.

One (12) of the rollers is then brought immediately in rotation by moving the holder 8 upward, as a result of which the skin is gripped between the two rollers of the skin gripping means 6. The roller 13 is driven via the tooth engagement with roller 12. The rollers here rotate in opposite directions with respect to each other, but towards the gripping line G: the rollers therefore are squeezing. Subsequently the rollers are moved upward to the position as shown in FIG. 4a, while the rollers rotate in opposite directions with respect to each other and as a result grip the skin between the corrugated portions. Also because the upper roller 13 is somewhat resilient in rotation the skin will not tear when passing between the toothings. When going upward into the position as shown in FIG. 4a the skin, together with the various membranes, is pulled off from the meat so that the bare meat is left. As a result of simultaneous rotation of the rollers and the upward movement, the skin is always approximately perpendicularly pulled off or lifted from the meat. Also the distance between the point where the skin becomes detached from the meat and the point where the skin is clamped is approximately equal to the radius of the rollers. As a result the chance of tearing the skin is reduced.

Arrived at the top in the position of FIG. 4a the alonggoing movement of the skinner stops and the support 3 runs on regularly. As a result the skin is pulled over the top side of the carcass portion as shown in FIG. 4b.

The skin gripping means formed by the rollers here firmly hold the skin and because the support now moves away from the skinner, the skin is pulled off from the carcass. This is shown in FIG. 4c, where the support with carcass has passed the skinner and the skinner keeps holding the skin between the rollers so that skin together with the breast membrane is also pulled off from the back side of the carcass. As a result a completely skinned carcass is left without skin residues. Moreover, the meat is not damaged. Because of the movement of the rollers combined with the rotation of the rollers the skin is pulled off from the meat almost perpendicularly as a result of which the skinning takes place in a reliable manner.

When the carcass has been moved a certain distance from the skinner and the skin has therefore become entirely detached from the carcass, the discharge means, shown in detail in FIG. 3 that has already been discussed, are activated. The gas cylinder 21 will eject the plate 17 over the lower roller and the upper roller will move along with the ejection plate. As a result the skin is slid from the lower roller and the skin is ejected sideward. After ejection the plate 17 will return to the original position and the two rollers will be positioned above and against each other again.

Figure 5:
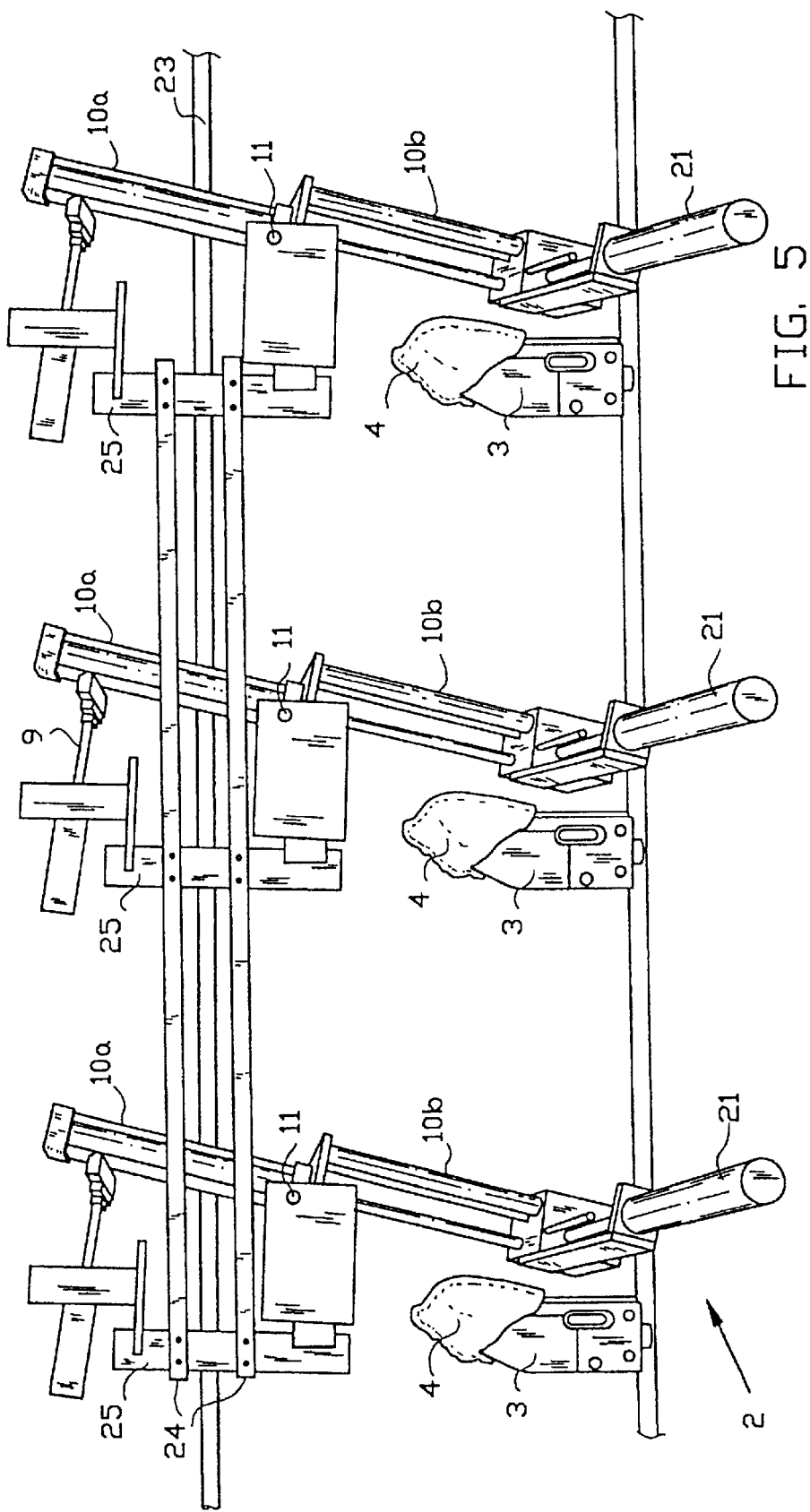
FIG. 5 shows an alternative embodiment.

FIG. 5 shows a device provided with a skinner in which 3 skinners as described above have been coupled to each other. As a result 3 carcasses can be simultaneously skinned after which the whole is moved counter to the direction of the carcasses, to the next 3 carcasses. As a result a very quick processing is possible. In the figure it can clearly be seen that the skinner has been mounted on a rail 23 as a result of which the entire skinner can be moved with respect to the conveyor 2. As a result the skinner will first move towards the carcass, subsequently be pressed against the carcass by the pressing means 9, while the skinner moves along with the carcasses, subsequently the skin gripping means will be moved upwards and at the top of the carcass as a result of which the skin is pulled off from the front of the carcass. Subsequently the skinner will stand still with respect to the carcasses or not move along less quickly with the carcasses as a result of which the skin is pulled off from the entire carcass. Subsequently the skin is ejected and the skinner starts moving back and takes the next 3 carcasses for treatment.

What is claimed is:

1. A device for processing poultry carcasses or parts thereof, comprising a conveyor having supports for retaining the carcasses or parts thereof, said conveyor is provided with means for leading the supports in a supply direction past at least one processing installation, a skinner for skinning the carcasses or parts thereof, said skinner is provided with two rollers for gripping the skin and means for moving the rollers relatively with respect to the carcass and substantially perpendicular to the supply direction during the skinning, a device for discharging the skin which includes means for moving one of either roller past its axis of rotation.

said discharge device comprises an ejection plate, perpendicular to the longitudinal axis of both rollers, wherein the first roller is attached to the ejection plate, and the ejection plate is provided with a hole for sliding over the second roller, wherein the ejection plate is provided with means for moving the ejection plate to a discharge position from an inactive position to the outside over and perpendicular to the axis of rotation of the second roller.

2. A device device for processing poultry carcasses or parts therof, comprising a conveyor having supports movably attached thereon for retaining the carcasses or parts thereof for leading the supports and carcasses retained thereon in a supply direction past at least one processing installation, said processing installation including a skinner movable in the supply direction for skinning a carcass or parts thereof, said skinner including two rollers having engaging teeth for gripping the skin of the carcass, said skinner configured for urging said rollers into engagement with the skin of the carcass as the carcass is moved on a support along the supply direction and as the skinner moves in the supply direction and moving said rollers substantially perpendicular to the supply direction during the engagement of the rollers with the skin of the carcass, and a device for discharging the skin from said rollers including means for moving the teeth of one roller longitudinally past the teeth of the other roller.

3. A device for processing poultry carcasses or parts thereof, comprising a conveyer having supports for retaining the carcasses or parts thereof, said conveyer is provided with means for leading the supports in a supply direction through a processing installation, a skinner for skinning the carcasses or parts thereof at said processing installation, said skinner having skin gripping means including a pair of toothed rollers each rotatable about its longitudinal axis and having their teeth movable toward engagement with each other for gripping and pulling skin from the carcasses with a first one of the toothed rollers movable along its longitudinal axis with respect to the other toothed roller a distance for separating the teeth of said rollers from each other, a skin ejection plate defining an opening surrounding and movable with respect to and along the axis of one of said toothed rollers as the first one of said rollers move along its longitudinal axis such that the skin ejection plate removes the skin from the gripping means.

* * * * *